(12) United States Patent
Bottreau

(10) Patent No.: US 6,954,500 B2
(45) Date of Patent: Oct. 11, 2005

(54) VIDEO CODING METHOD USING A BLOCK MATCHING PROCESS

(75) Inventor: Vincent Bottreau, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 664 days.

(21) Appl. No.: 10/011,211

(22) Filed: Nov. 15, 2001

(65) Prior Publication Data

US 2002/0110194 A1 Aug. 15, 2002

(30) Foreign Application Priority Data

Nov. 17, 2000 (EP) .............................................. 00403220

(51) Int. Cl.$^7$ ........................... H04N 7/12; H04N 11/02
(52) U.S. Cl. ............................ 375/240.16; 375/240.12; 375/240.24
(58) Field of Search ........................ 375/240.11, 240.1, 375/240.19, 240.12, 240.16

(56) References Cited

U.S. PATENT DOCUMENTS 5,633,684 A * 5/1997 Teranishi et al. ...... 375/240.11
6,125,143 A * 9/2000 Suzuki et al. .......... 375/240.11
6,657,676 B1 * 12/2003 Borneo et al. .............. 348/607

OTHER PUBLICATIONS

"Three–Dimensional Subband Coding of Video", by C.I. Podilchuk et al., IEEE Transactions on Image Processing, vol. 4, pp. 125–139, Feb. 1995.

"MPEG Video Coding, A basic tutorial introduction", by S.R. Ely, Research and Development Report, BBC–RD–Mar. 1996.

"Three–Dimensional Subband Coding with Motion Compensation", by Jens–Rainer Ohm, , IEEE Transactions on Image Processing, vol. 3, No. 5., pp. 559–671, Sep. 1994.

* cited by examiner

*Primary Examiner*—Chris Kelley
*Assistant Examiner*—Erick Rekstad

(57) ABSTRACT

The invention relates to the field of two-dimensional subband coding techniques, extended to video data by including the temporal domain within the decomposition: in order to deal with objects having large displacements, motion estimation and compensation are added, which may however result in considerable information overhead to the detriment of texture. For a good trade-off between the need of a true motion field and the size of the resulting motion information to be encoded, the invention relates to a method allowing to keep the amount of motion vector information reasonably low and to allocate more bits to texture in non-moving areas. Said method first performs a preliminary analysis which allows to identify parts of the image not requiring a precise description of the motion information, followed by a motion estimation on the basis of this preliminary information. A decision based on the energy of the high frequency temporally filtered subbands is then taken, before the final motion compensation operation, in view of the selection of the most appropriate motion vector.

8 Claims, 3 Drawing Sheets

VIDEO CODING METHOD USING A BLOCK MATCHING PROCESS

The present invention relates to a coding method for the compression of a video sequence organized in successive groups of frames (GOF), said method comprising a decomposition step by means of a three-dimensional (3D) wavelet transform, leading to a given number of successive resolution levels, a motion compensation step by means of a motion compensation operation performed at each decomposition level, and a coding step.

The invention also relates to a set of instructions organized in computer-executable process steps and stored on a computer-readable storage medium in view of the implementation of said coding method, and to a coded signal obtained by implementation of said coding method or said process steps.

In recent years, two-dimensional subband coding techniques have been extended to video data by including the temporal domain within the subband decomposition. The first proposed solutions, such as described for instance in "Three-dimensional subband video coding of video", by C. I. Podilchuk and al., IEEE Transactions on Image Processing, vol. 4, pp. 125–139, February 1995, did not include motion compensation, taking advantage of the fact that in case of small motion, the signal energy is well concentrated in low frequency temporal subbands (or approximation subbands). Such coding schemes with no motion compensation have some advantages such as low computational complexity, few motion artifacts (except from blurring), or limited error propagation. However, in case of objects having large displacements, spatial frequencies are shared along the temporal axis, and the high frequency temporal subbands (or detail subbands) contain high energy. Moreover, the lower temporal subbands are very likely to be blurred, which is the main drawback when temporal scalability is targeted (creation of video having multiples frame rates from a single encoded bitstream).

Motion estimation and motion compensation may therefore be considered as key components in the design of an efficient scalable video-coding scheme. Most of the known motion-compensated subband coding schemes implement a block-based motion estimation (the principle of the block matching algorithm or BMA is described for example in "MPEG video coding: a basic tutorial introduction", by S. R. Ely, Research and Development Report, BBC-RD-1996/3: each block in the current image $I_t$ is matched to search regions in a reference image $I_{t-1}$, and the retained motion vector, shared between all the pixels belonging to the same block, corresponds to the one that results in the highest correlation—measured by the sum of absolute difference—inside the measurement window).

Other methods exist, for example methods that include a variable size block-based motion estimation or generate a denser near-continuous motion field, but, whatever the method, the accuracy of the motion analysis is important, since a motion compensated filtering operation provides lower frame rate subbands that will be further encoded. Consequently, any motion artifact in these subbands will damage the quality of the reconstructed low frame-rate videos. The main contradictory requirements for motion estimation and compensation techniques are to provide a good temporal prediction (true motion) while keeping the motion information overhead (prediction error and motion parameters) rather low in order not to reduce drastically the bit-budget available for texture encoding.

When a fixed size block-based motion estimation is employed, two kinds of motion vectors are usually generated. For instance, in the case of macroblocks of 16×16 pixels, either one or four motion vectors (one for each of the four 8×8-pixel blocks inside the macroblocks) can be created: the left part of FIG. 1 corresponds to the first case where four blocks share the same motion vector (a 16×16-pixel macroblock motion vector), while its right part corresponds to the second case where each of the four 8×8-pixel blocks has its own motion vector (a 8×8-pixel block motion vector). The decision between these two modes is commonly taken by looking at the distortion, given for example by the sum of absolute differences (SAD) between the motion-predicted macroblock from the reference frame and the original macroblock in the current frame to be predicted. If 8×8-pixel blocks generally produce a better motion field, they generate four times as much motion vectors that have to be encoded and transmitted than 16×16-pixel macroblocks. This may result in considerable information overhead to the detriment of texture in case of low bit-rate applications.

It is therefore an object of the invention to propose a method better adapted to low bit-rate video coding, where the amount of motion vector information is kept reasonably low in comparison to the texture information.

To this end, the invention relates to a coding method such as defined in the introductory part of the description and which is moreover characterized in that the motion compensation step, applied to frames divided into macroblocks themselves subdivided into blocks, itself comprises, for each successive group of frames, the sub-steps of:

(A) first, temporally high filtering the current GOF without any motion estimation and compensation;

(B) then applying to said GOF a motion compensated temporal filtering comprising the following operations:

(1) for each macroblock of the high frequency temporal subbands thus obtained, comparing its mean square error (MSE) to the one of the entire subband and associating a flag only to macroblocks whose MSE is greater than said MSE of the entire subband;

(2) for each couple of frames of said GOF, performing a block-based motion estimation for each block of the macroblocks with flags and a macroblock-based motion estimation for the macroblocks without flags;

(3) selecting in view of the final motion compensation sub-step:

(a) for the macroblocks with flags, a motion vector according to a final decision between macroblock and block motion vectors, based on the minimum sum of absolute differences (SAD);

(b) for the macroblocks without any flag, a motion vector according to the macroblock-based motion estimation.

This method first performs a preliminary analysis of the high frequency temporal subbands obtained without motion estimation, for identifying the parts of the image that do not require an exhaustive processing and, a fortiori, a very precise description of the motion information. Motion estimation and compensation are then conventionally applied, taking into account this preliminary information in order to force a decision between block or macroblock motion estimation. The decision criterion is based on the energy of the high frequency temporally filtered sub-bands. This decision results in:

a decrease of the computational load of the motion estimation, by allowing fewer block-based motion estimation steps related to the smaller blocks;

an increase of the bit-budget for the texture encoding, by means of a reduction of the number of motion vectors to be encoded.

The technical solution thus proposed allows to allocate more bits for texture in regions of the image that do not require a true motion field, that is non-moving areas, without modifying the processing of regions that require a more precise motion analysis with the smaller blocks, for instance boundaries of moving objects.

Another object of the invention is to propose a set of instructions organized in computer-executable process steps capable of coding a video sequence and stored on a computer-readable storage medium.

To this end, the invention relates, for use in a video encoder receiving for compression a video sequence organized in successive groups of frames, to computer-executable process steps provided to be stored on a computer-readable storage medium for coding said frames and comprising a decomposition step by means of a three-dimensional (3D) wavelet transform, leading to a given number of successive resolution levels, a motion compensation step by means of a motion compensation operation performed at each decomposition level, and a coding step, said motion compensation step, applied to frames divided into macroblocks themselves subdivided into blocks, itself comprising, for each successive group of frames, the following sub-steps:

(A) first, temporally high filtering the current GOF without any motion estimation;

(B) then applying to said GOF a motion compensated temporal filtering comprising the following operations:

(1) for each macroblock of the high frequency temporal subbands thus obtained, comparing its mean square error (MSE) to the one of the entire subband and associating a flag only to macroblocks whose MSE is greater than said MSE of the entire subband;

(2) for each couple of frames of said GOF, performing a block-based motion estimation for each block of the macroblocks with flags and a macroblock-based motion estimation for the macroblocks without flags;

(3) selecting in view of the final motion compensation sub-step:

(a) for the macroblocks with flags, a motion vector according to a final decision between macroblock and block motion vectors, based on the minimum sum of absolute differences (SAD);

(b) for the macroblocks without any flag, a motion vector according to the macroblock-based motion estimation.

The present invention will now be described, by way of example, with reference to the accompanying drawings in which.

Figure 4:
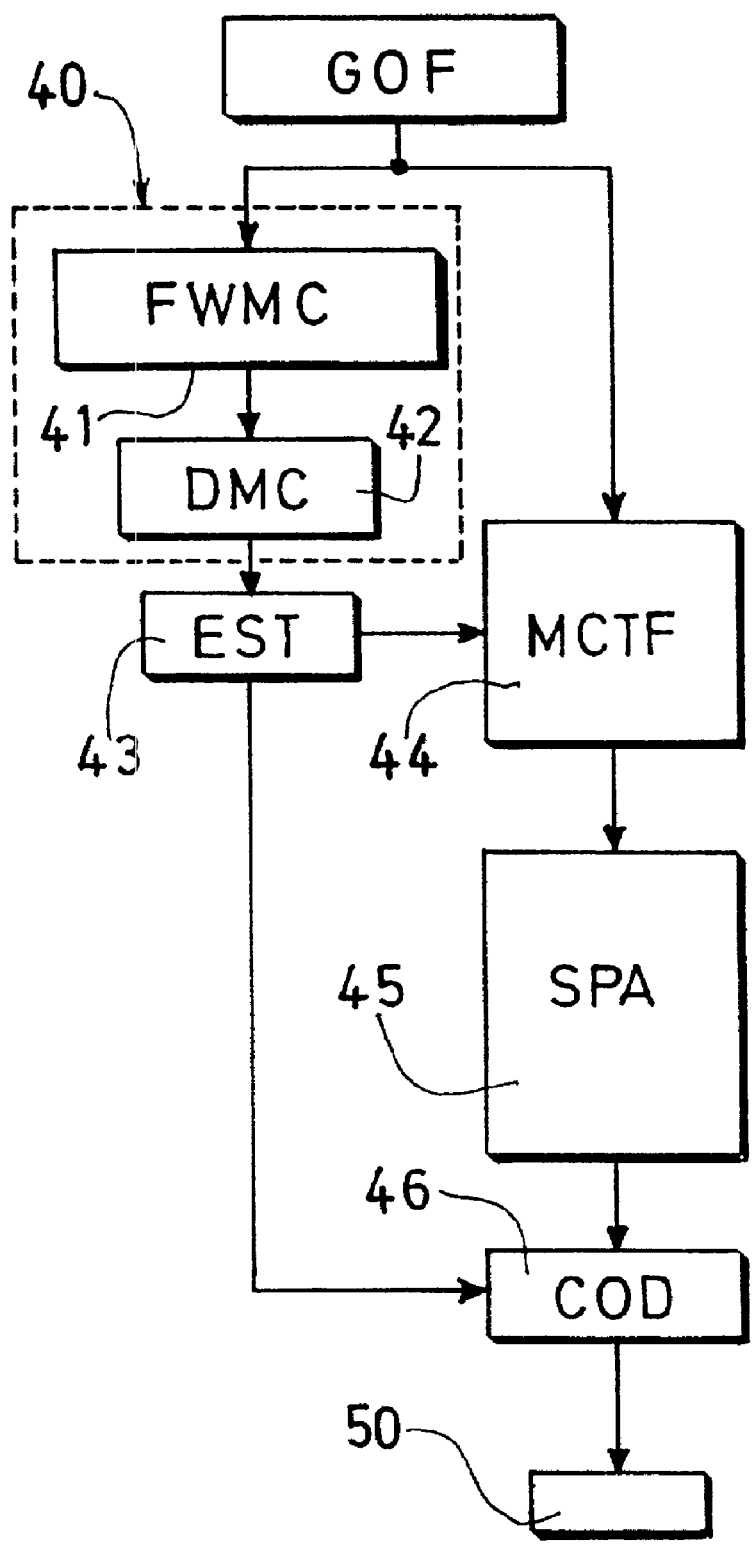

FIG. 4 gives a global flowchart of the coding method according to the invention.

Figure 1:
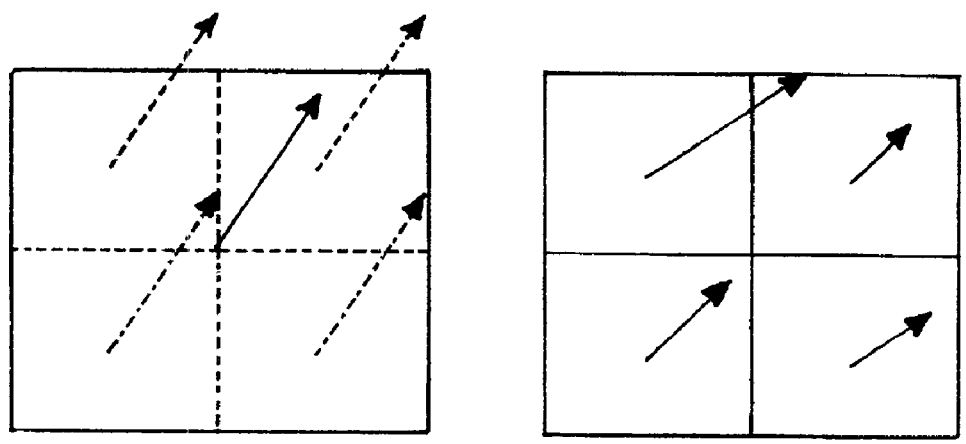
FIG. 1 illustrates a comparison between 16×16 and 8×8-pixel block motion vectors for the same macroblock of 16×16 pixels (respectively, left and right parts of said FIG. 1)
Figure 3:
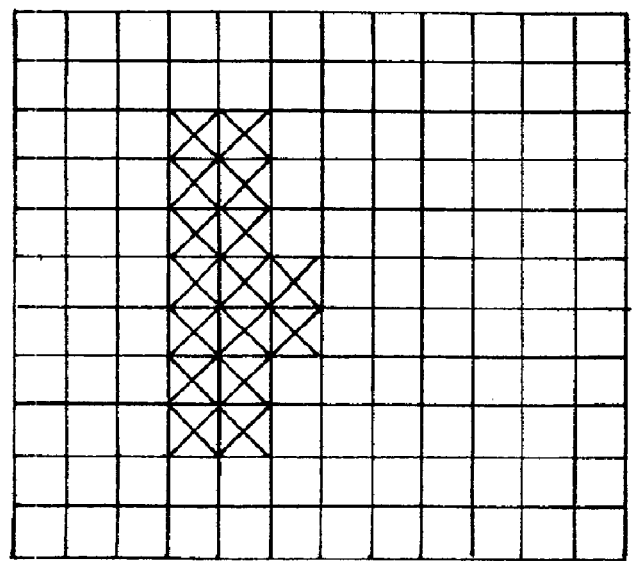
FIG. 3 shows an example of an 8×8-decision map deduced from the analysis of the high frequency temporal subband obtained after the temporal filtering step without motion compensation.
Figure 2:
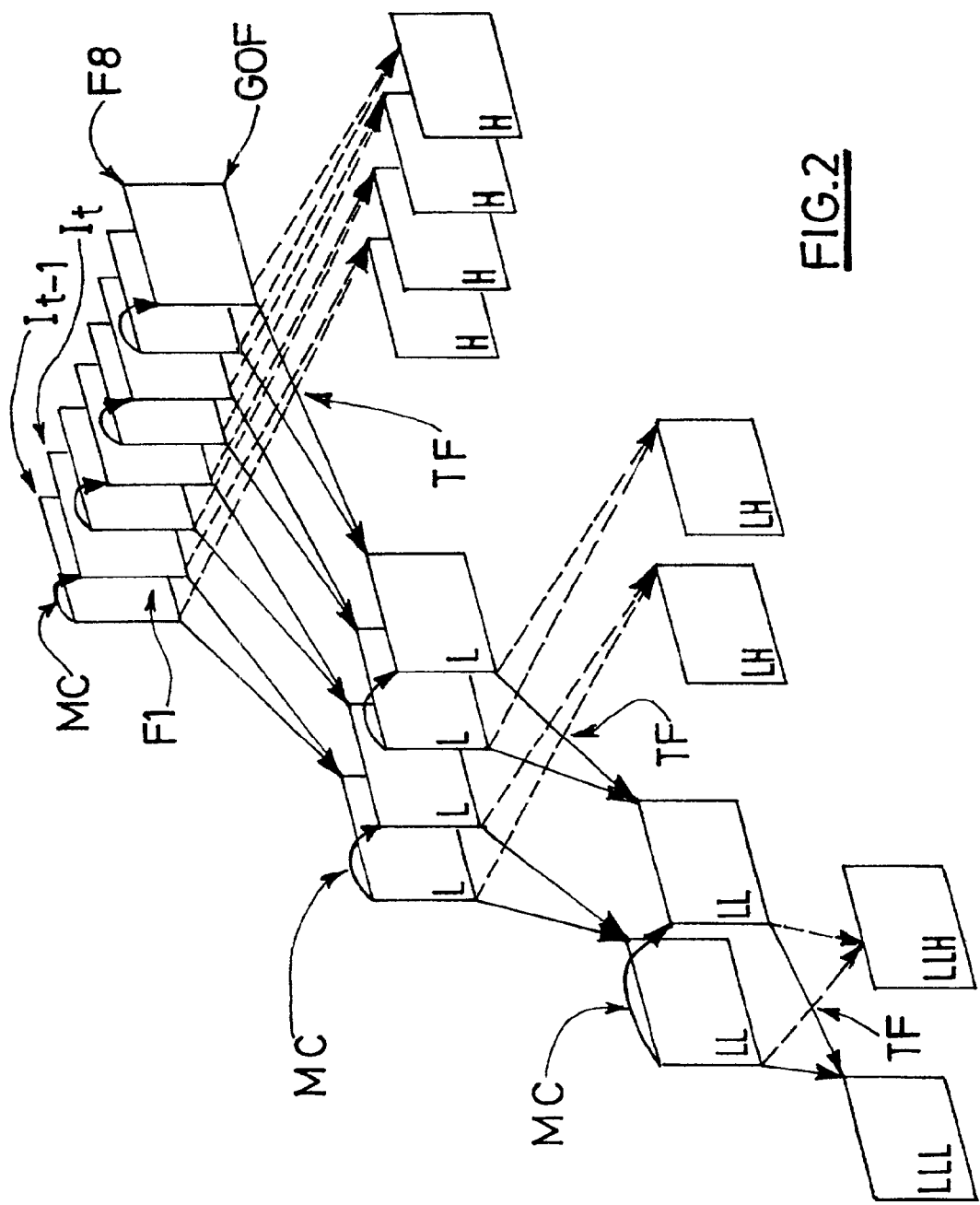
FIG. 2 illustrates the principle of temporal filtering without motion estimation and compensation, as used in the coding method according to the present invention: the high frequency temporal subbands (LLH, LH, H) obtained in that case are analyzed to decide for each macroblock whether 8×8-pixel block-based motion estimation is required or not.

The technical solution implemented in the coding method according to the invention consists of introducing a dynamical preselection criterion in the block or macroblock decision, which allows to choose, for the selection of the motion vectors, one of the two modes respectively illustrated in FIG. 1. A decomposition process by means of a temporal subband decomposition of the video information is illustrated in FIG. 2. The decomposition with motion compensation is applied to a group of frames (GOF), referenced F1 to F8: each GOF of the input video is first motion-compensated (MC) and then temporally filtered (TF) using Haar wavelets (the dotted arrows correspond to a high-pass temporal filtering, while the other ones correspond to a low-pass temporal filtering). In FIG. 2, three stages of decomposition are shown (L and H=first stage; LL and LH=second stage; LLL and LLH=third stage). In the present case, a temporal filtering operation is first carried out on the input group of frames without any motion estimation and compensation (i.e. the operations referenced MC in FIG. 2 are not implemented), the motion vectors being arbitrarily set to zero, said operation resulting in a high frequency temporal subband (most of the parts of an image are generally still between two successive original frames $I_{t-1}$, $I_t$ and consequently do not require precise motion estimation). The proposed preselection criterion is then based on the energy of this high frequency temporally filtered subband. The mean square error is computed for each 16×16-pixel macroblock of such a subband. Then, for a macroblock whose MSE is greater than the MSE of the entire subband, that is to say for a macroblock that represents a region of the image with high motion activity, a flag that enables the block-decision (the 8×8 decision, in the present case) is set. As shown in the example of FIG. 3, a 8×8 decision map is constituted on the basis of all the 8×8-pixel block-based motion estimation flags thus obtained (designated by the crosses): only the macroblocks to which such flags are associated will be estimated with 8×8-pixel blocks.

Thanks to this additional information in the form of an 8×8-decision map, a modified motion-compensated temporal filtering operation is then carried out on the input GOF. For each couple of original frames ($I_{t-1}$, $I_t$), a motion estimation is performed with 8×8 or 16×16-pixel BMA according to the 8×8-decision map. For a macroblock on which a 8×8-pixel BMA is applied, the final decision between 16×16 and 8×8-pixel block motion vectors is kept the same (based on $$SAD = \frac{1}{N} \sum_{i=1}^{N} \sum_{j=1}^{N} |I_{t-1}(i+m, j+n) - I_t(i, j)|,$$

for a N×N-pixel (macro) block, where (m, n) is the motion vector of the (macro) block, and $I_{t-1}$, $I_t$ are respectively the luminance functions of reference image at time t-1 and current image at time t). Finally, the retained motion representation is the one that gives the minimum SAD.

Tests show that 8×8-decision flags are set on macroblocks that would have been computed with 8×8-pixel BMA during the final decision anyway. The final number of these macroblocks is always smaller than with classical motion-compensated temporal filtering. In the final images, fewer white and black areas are noticeable thanks to the motion analysis and prediction. For others macroblocks on which only 16×16-pixel BMA is processed as a consequence of the 8×8-decision map, no useless 8×8-pixel BMA is used, which reduces the computational complexity of the motion estimation operation (it may indeed be considered that the load corresponding to the additional computations of the high frequency temporal subbands, temporally filtered without motion estimation, and to the 8×8-decision map is low).

A global flowchart of the video coding method according to the invention is given in FIG. 4: the input video signal, constituted by a GOF, is first received by a temporal analysis stage 40, provided for carrying out a temporal filtering step 41 without motion compensation (FWMC), followed by a step 42 (DMC) during which the 8×8 decision map is constituted. On the basis of this information, a motion estimation 43 (EST) with 8×8 or 16×16 pixel BMA is performed, and this motion estimation then allows to carry out on the input video signal (the current GOF) a modified temporal filtering step 44 including a motion compensation (MCTF). As in a conventional coding scheme, an analysis step 45 (SPA) (performing for instance a DCT transform and a quantization step) is then carried out on the filtered signal thus obtained, and the spatial analysis is finally followed by a coding step 46 (COD), performing the coding operation of the processed input video signal and of the motion vectors obtained by means of the motion estimation step 43. The coded signals are then sent towards a channel 50, or stored.

The video coder carrying out the steps of said flowchart may also be of the type in which the input frame signals corresponding to the video sequence organized in successive groups of frames (GOF) are split in frequency into subbands for hierarchically splitting the frequency spectrum of said input signals into a plurality of frequency bands and, after a motion compensation operation between frames of the sequence, variable-length coded in view of a transmission or storing operation. In that coder, the motion compensation step, applied to the frames divided into macroblocks themselves subdivided into blocks, comprises, for each successive GOF the following sub-steps:

(A) first, temporally high filtering the current GOF without any motion estimation and compensation;

(B) then applying to said GOF a motion compensated temporal filtering comprising the following operations:

(1) for each macroblock of the high frequency temporal subbands thus obtained, comparing its mean square error (MSE) to the one of the entire subband and associating a flag only to macroblocks whose MSE is greater than said MSE of the entire subband;

(2) for each couple of frames of said GOF, performing a block-based motion estimation for each block of the macroblocks with flags and a macroblock-based motion estimation for the macroblocks without flags;

(3) selecting in view of the final motion compensation sub-step:

(a) for the macroblocks with flags, a motion vector according to a final decision between macroblock and block motion vectors, based on the minimum sum of absolute differences (SAD);

(b) for the macroblocks without any flag, a motion vector according to the macroblock-based motion estimation.

The invention is obviously not limited to the embodiment that has been described. The proposed temporal pre-analysis may be applied to any video compression scheme using the BMA in view of a motion estimation. Whatever the type of embodiment, the method according to the invention allows to obtain a good trade-off between the need of a true motion field and the size of the resulting motion information to be encoded.

What is claimed is:

1. A coding method for the compression of a video sequence organized in successive groups of frames (GOF), said method comprising a decomposition step by means of a three-dimensional (3D) wavelet transform, leading to a given number of successive resolution levels, a motion compensation step by means of a motion compensation operation performed at each decomposition level, and a coding step, said motion compensation step, applied to frames divided into macroblocks themselves subdivided into blocks, itself comprising, for each successive group of frames, the sub-steps of:

(A) first, temporally high filtering the current GOF without any motion estimation and compensation;

(B) then applying to said GOF a motion compensated temporal filtering comprising the following operations:

(1) for each macroblock of the high frequency temporal subbands thus obtained, comparing its mean square error (MSE) to the one of the entire subband and associating a flag only to macroblocks whose MSE is greater than said MSE of the entire subband;

(2) for each couple of frames of said GOF, performing a block-based motion estimation for each block of the macroblocks with flags and a macroblock-based motion estimation for the macroblocks without flags;

(3) selecting in view of the final motion compensation sub-step:

(a) for the macroblocks with flags, a motion vector according to a final decision between macroblock and block motion vectors, based on the minimum sum of absolute differences (SAD);

(b) for the macroblocks without any flag, a motion vector according to the macroblock-based motion estimation.

2. A coding method according to claim 1, wherein said macroblocks have a size of 16×16 pixels and said blocks have a size of 8×8 pixels.

3. A video coder in which input frame signals corresponding to a video sequence organized in successive groups of frames (GOF) are split in frequency into subbands for hierarchically splitting the frequency spectrum of said input signals into a plurality of frequency bands and, after a motion compensation operation between frames of the sequence, variable-length coded in view of a transmission or storing operation, said motion compensation step, applied to frames divided into macroblocks themselves subdivided into blocks, comprising, for each successive GOF, the following sub-steps:

(A) first, temporally high filtering the current GOF without any motion estimation and compensation;

(B) then applying to said GOF a motion compensated temporal filtering comprising the following operations:

(1) for each macroblock of the high frequency temporal subbands thus obtained, comparing its mean square error (MSE) to the one of the entire subband and associating a flag only to macroblocks whose MSE is greater than said MSE of the entire subband;

(2) for each couple of frames of said GOF, performing a block-based motion estimation for each block of the macroblocks with flags and a macroblock-based motion estimation for the macroblocks without flags;

(3) selecting in view of the final motion compensation sub-step:

(a) for the macroblocks with flags, a motion vector according to a final decision between macroblock and block motion vectors, based on the minimum sum of absolute differences (SAD);

(b) for the macroblocks without any flag, a motion vector according to the macroblock-based motion estimation.

4. For use in a video coder receiving in view of its compression a video sequence organized in successive groups of frames (GOF), computer-executable process steps provided to be stored on a computer-readable storage medium for coding said frames and comprising a decomposition step by means of a three-dimensional (3D) wavelet transform, leading to a given number of successive resolution levels, a motion compensation step by means of a motion compensation operation performed at each decomposition level, and a coding step, said motion compensation step, applied to frames divided into macroblocks themselves subdivided into blocks, itself comprising, for each successive GOF, the following sub-steps:

(A) first, temporally high filtering the current GOF without any motion estimation and compensation;

(B) then applying to said GOF a motion compensated temporal filtering comprising the following operations:

(1) for each macroblock of the high frequency temporal subbands thus obtained, comparing its mean square error (MSE) to the one of the entire subband and associating a flag only to macroblocks whose MSE is greater than said MSE of the entire subband;

(2) for each couple of frames of said GOF, performing a block-based motion estimation for each block of the macroblocks with flags and a macroblock-based motion estimation for the macroblocks without flags;

(3) selecting in view of the final motion compensation sub-step:

(a) for the macroblocks with flags, a motion vector according to a final decision between macroblock and block motion vectors, based on the minimum sum of absolute differences (SAD);

(b) for the macroblocks without any flag, a motion vector according to the macroblock-based motion estimation.

5. A computer program product for a video coder that receives in view of its compression a video sequence organized in successive groups of frames, comprising a set of instructions which when loaded into said coder lead it to carry out the process steps as claimed in claim 4.

6. A transmittable coded signal produced by compressing a video sequence, organized in successive groups of frames (GOF), according to a coding method comprising a decomposition step by means of a three-dimensional (3D) wavelet transform, leading to a given number of successive resolution levels, a motion compensation step by means of a motion compensation operation performed at each decomposition level, and a coding step, said motion compensation step, applied to frames divided into macroblocks themselves subdivided into blocks, itself comprising, for each successive GOF, the sub-steps of:

(A) first, temporally high filtering the current GOF without any motion estimation;

(B) then applying to said GOF a motion compensated temporal filtering comprising the following operations:

(1) for each macroblock of the high frequency temporal subbands thus obtained, comparing its mean square error (MSE) to the one of the entire subband and associating a flag only to macroblocks whose MSE is greater than said MSE of the entire subband;

(2) for each couple of frames of said GOF, performing a block-based motion estimation for each block of the macroblocks with flags and a macroblock-based motion estimation for the macroblocks without flags;

(3) selecting in view of the final motion compensation sub-step:

(a) for the macroblocks with flags, a motion vector according to a final decision between macroblock and block motion vectors, based on the minimum sum of absolute differences (SAD);

(b) for the macroblocks without any flag, a motion vector according to the macroblock-based motion estimation.

7. A coding method for compresing of a video sequence organized in successive groups of frames (GOF), the method comprising:

decomposing the video sequence using a three-dimensional (3D) wavelet transform;

motion compensating, each successive group of frames that are divided into macroblocks and subdivided into blocks, by (A) first, filtering the current GOF without any motion estimation and compensation;

(B) then applying a motion compensated temporal filtering including the following operations:

(1) for each macroblock of a subband, comparing its mean square error (MSE) to the one of the entire subband and associating a flag only to macroblocks whose MSE is greater than the MSE of the entire subband;

(2) for each couple of frames of the GOF, performing a block-based motion estimation for each block of the macroblocks with flags and a macroblock-based motion estimation for the macroblocks without flags; and (3) selecting (a) for the macroblocks with flags, a motion vector according to a final decision between macroblock and block motion vectors, based on the minimum sum of absolute differences (SAD), and (b) for the macroblocks without any flag, a motion vector according to the macroblock-based motion estimation.

8. A coding method according to claim 7, wherein the macroblocks have a size of 16×16 pixels and said blocks have a size of 8×8 pixels.

* * * * *